US008657362B2

(12) United States Patent
Schulz et al.

(10) Patent No.: US 8,657,362 B2
(45) Date of Patent: Feb. 25, 2014

(54) CONVERTIBLE HAVING A ROOF ARRANGEMENT

(75) Inventors: Lars Schulz, Schoeneiche (DE); Reiner Armbruster, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 31 days.

(21) Appl. No.: 13/008,923

(22) Filed: Jan. 19, 2011

(65) Prior Publication Data

US 2011/0175402 A1 Jul. 21, 2011

(30) Foreign Application Priority Data

Jan. 20, 2010 (DE) .......................... 10 2010 005 029

(51) Int. Cl.
*B60J 7/00* (2006.01)
*B60J 1/20* (2006.01)
*B60J 7/02* (2006.01)

(52) U.S. Cl.
USPC .................. 296/180.1; 296/180.2; 296/180.5; 296/217

(58) Field of Classification Search
USPC .......... 296/180.1, 180.2, 180.3, 108.4, 180.5, 296/107.16, 107.15, 107.17, 107.11, 296/107.09, 107.07, 108, 116, 117, 118, 296/121, 146.14
See application file for complete search history.

(56) References Cited

U.S. PATENT DOCUMENTS

| | | | | |
|---|---|---|---|---|
| 4,946,354 A * | 8/1990 | Aubry et al. | .................. | 416/158 |
| 5,141,283 A * | 8/1992 | Omoto et al. | ................. | 296/219 |
| 5,903,119 A * | 5/1999 | Laurain et al. | ................ | 318/265 |
| 6,030,027 A * | 2/2000 | Graf | ........................... | 296/180.1 |
| 6,320,342 B1 * | 11/2001 | Yoshioka et al. | ............. | 318/467 |
| 6,354,974 B1 | 3/2002 | Kozarekar | | |
| 6,455,968 B2 | 9/2002 | Honorio et al. | | |
| 6,565,145 B2 * | 5/2003 | Pettey | ........................ | 296/180.5 |
| 6,672,657 B2 * | 1/2004 | Biecker et al. | ................ | 296/217 |
| 6,682,149 B1 * | 1/2004 | Guillez et al. | ................ | 296/108 |
| 6,736,228 B2 | 5/2004 | Donohue et al. | | |
| 6,946,811 B2 * | 9/2005 | Kikuta et al. | .................. | 318/468 |
| 7,293,637 B2 | 11/2007 | Janson et al. | | |
| 7,399,025 B2 | 7/2008 | Hermann et al. | | |

(Continued)

FOREIGN PATENT DOCUMENTS

| | | |
|---|---|---|
| DE | 10 2004 030 660 | 1/2006 |
| DE | 10 2005 040 771 | 3/2007 |

(Continued)

*Primary Examiner* — Glenn Dayoan
*Assistant Examiner* — Sunsurraye Westbrook
(74) *Attorney, Agent, or Firm* — Gerald E. Hespos; Michael J. Porco; Matthew T. Hespos

(57) ABSTRACT

A convertible has a roof (8) that can be adjusted between an opened and covered positions and a wind deflector (12) that can be adjusted between a retracted position (RS) and a deployed position (WS). The wind deflector (12) is mounted movably on longitudinal sides (2) of the convertible (1) adjacent to interior paneling (10) and has a section underneath the interior paneling (10). Openings (17) for a soft top linkage of the convertible can be closed or opened by flaps (16) on the longitudinal sides (2) of the convertible (1) adjacent to the wind deflector (12). The convertible (1) also has a control device (19) for the roof arrangement (8) and a position-detection device (27) for the flap (16). The control device (19) permits adjustment of the roof (8) only if the position-detection device (27) detects an open position (P2) of the flap (16).

8 Claims, 4 Drawing Sheets

(56) References Cited

U.S. PATENT DOCUMENTS

| | | |
|---|---|---|
| 7,431,138 B2 | 10/2008 | Heinrich et al. |
| 7,485,061 B2 | 2/2009 | Reisch et al. |
| 2002/0021022 A1* | 2/2002 | Erdelitsch et al. ......... 296/180.1 |
| 2007/0089962 A1 | 4/2007 | Enstrom |
| 2007/0108857 A1 | 5/2007 | Nomura et al. |
| 2008/0061599 A1* | 3/2008 | Goetz et al. ................ 296/180.5 |
| 2009/0283344 A1 | 11/2009 | Arnold et al. |

FOREIGN PATENT DOCUMENTS

| | | |
|---|---|---|
| DE | 10 2006 034 445 | 10/2007 |
| EP | 1 112 884 | 7/2001 |
| WO | 2008/025691 | 3/2008 |
| WO | 2008/092426 | 8/2008 |
| WO | 2010/007122 | 1/2010 |

* cited by examiner

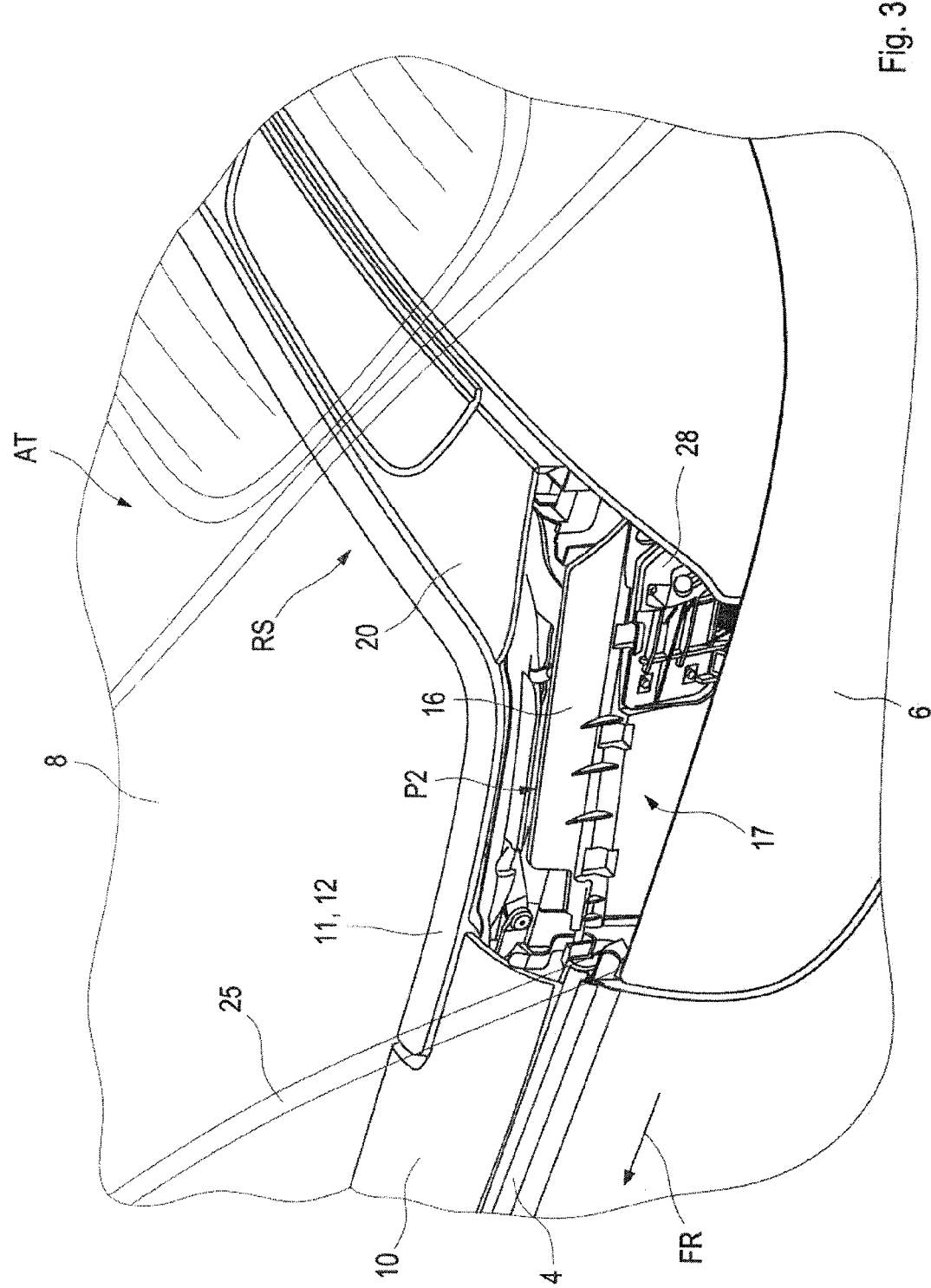

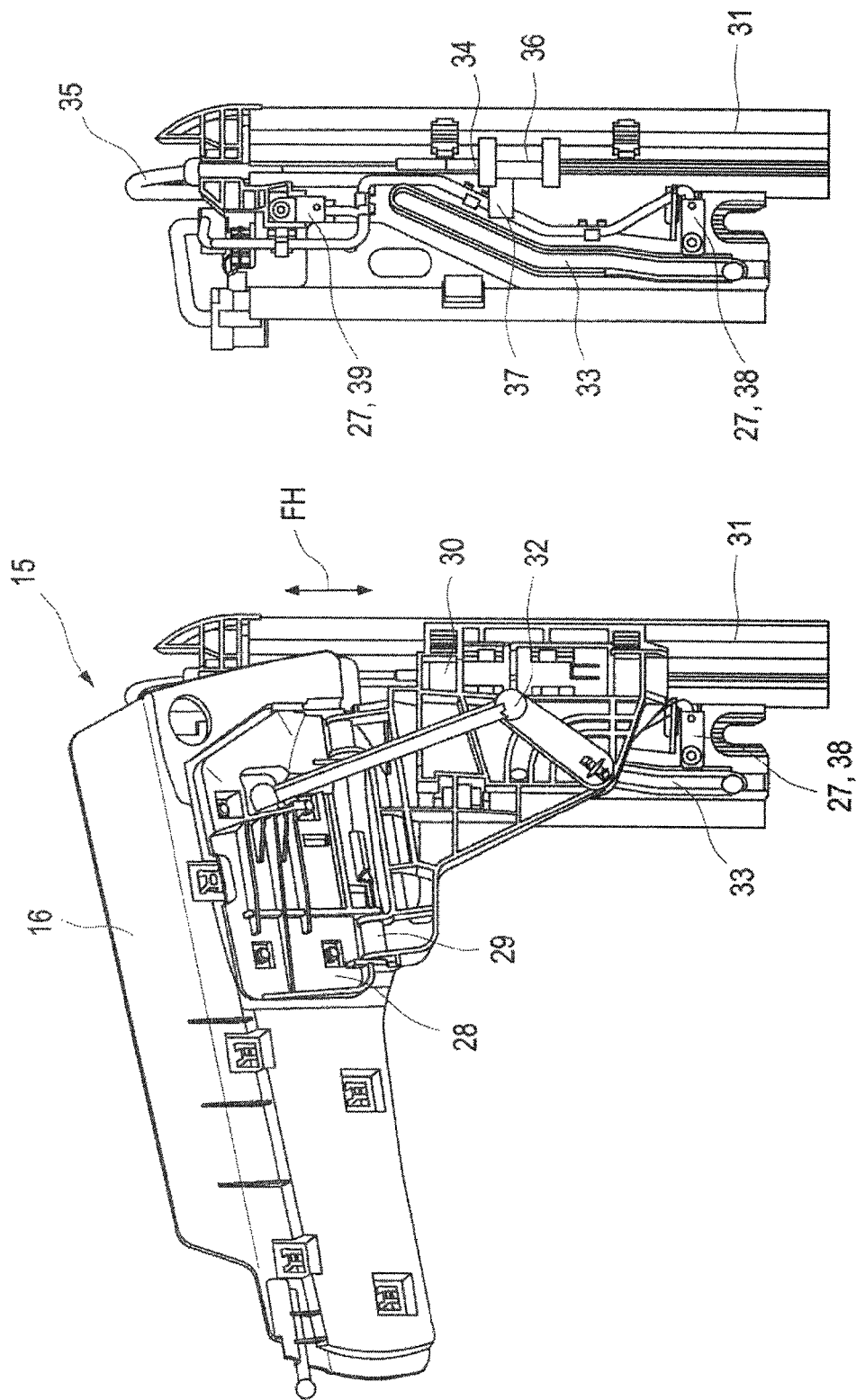

CONVERTIBLE HAVING A ROOF ARRANGEMENT

CROSS-REFERENCE TO RELATED APPLICATION

This application claims priority under 35 USC 119 to German Patent Application No. 10 2010 005 029.6, filed on Jan. 20, 2010, the entire disclosure of which is incorporated herein by reference.

BACKGROUND OF THE INVENTION

1. Field of the Invention.

The invention relates to a convertible having a roof arrangement.

2. Description of the Related Art.

DE 10 2006 034 445 B3 discloses a convertible with an adjustable roof and an adjustable wind deflector. The adjustable wind deflector has two wind deflector elements, namely, a deployment bow and a stay, that are used to deploy a flexible planar structure as a windbreak. The wind deflector elements can be adjusted into an upright operative position and a lowered position of rest. For this purpose, the wind deflector elements are mounted adjacent to the longitudinal sides in a pivoting axis and can be adjusted about the pivoting axis between the operative position and the position of rest. In this context, the pivoting axes are located adjacent and underneath the interior paneling. Thus, a section or section is arranged underneath the interior paneling.

The object of the invention is to optimize the above-described convertible.

SUMMARY OF THE INVENTION

The invention relates to a convertible with a linkage flap arrangement that has a flap for optionally closing or opening a linkage through-opening. The linkage through-opening functions for passing a soft top linkage of the convertible when the soft top linkage or the soft top is to assume its closed position. The soft top linkage usually is moved into abutment against a soft top bearing underneath the interior paneling. The invention also provides a control device that permits adjustment of the roof arrangement only if a position detector detects an open position of the flap so that the linkage through-opening is opened. Thus, a linkage of the roof arrangement will not collide with the flap. The flap can be moved by a separate drive and a mechanical forced coupling with the linkage of the roof arrangement can be dispensed with.

The adjustment of the wind deflector element preferably takes place only if the position detector detects a closed position of the flaps. The adjustment of the wind deflector element preferably is enabled by the control device.

A second adjustable wind deflector element preferably is provided and may be connected to the first wind deflector element via a coupling underneath the interior paneling. It is thus possible for the drive device to drive only the first or second wind deflector element or the coupling device for the adjustment movement. The fact that the control device permits adjustment of the wind deflector element or elements only if the flap assumes its closed position also prevents the first or second wind deflector element or the coupling device from colliding with the flap.

The drive device for the wind deflector element also preferably activates the at least one flap of the linkage flap arrangement. In a preferred embodiment, the wind deflector element is adjusted only if an adjustment movement of the flap is terminated and the flap assumes the closed position.

A guide preferably is provided so that the flap of the linkage flap arrangement can be moved. More particularly, the position detector or sensor, is arranged on the guide of the flap. Therefore, the position of the flap can be detected easily.

According to one embodiment, the roof arrangement is adjusted only if the wind deflector element assumes its position of rest.

An exemplary embodiment of the invention is explained in more detail below with reference to the drawings.

BRIEF DESCRIPTION OF THE DRAWINGS

FIG. 3 shows the convertible of FIG. 1 with a soft top of the convertible in a closed position.

FIGS. 4 and 5 are illustrations of a detail of a linkage flap arrangement.

DETAILED DESCRIPTION OF THE PREFERRED EMBODIMENT

Figure 1:
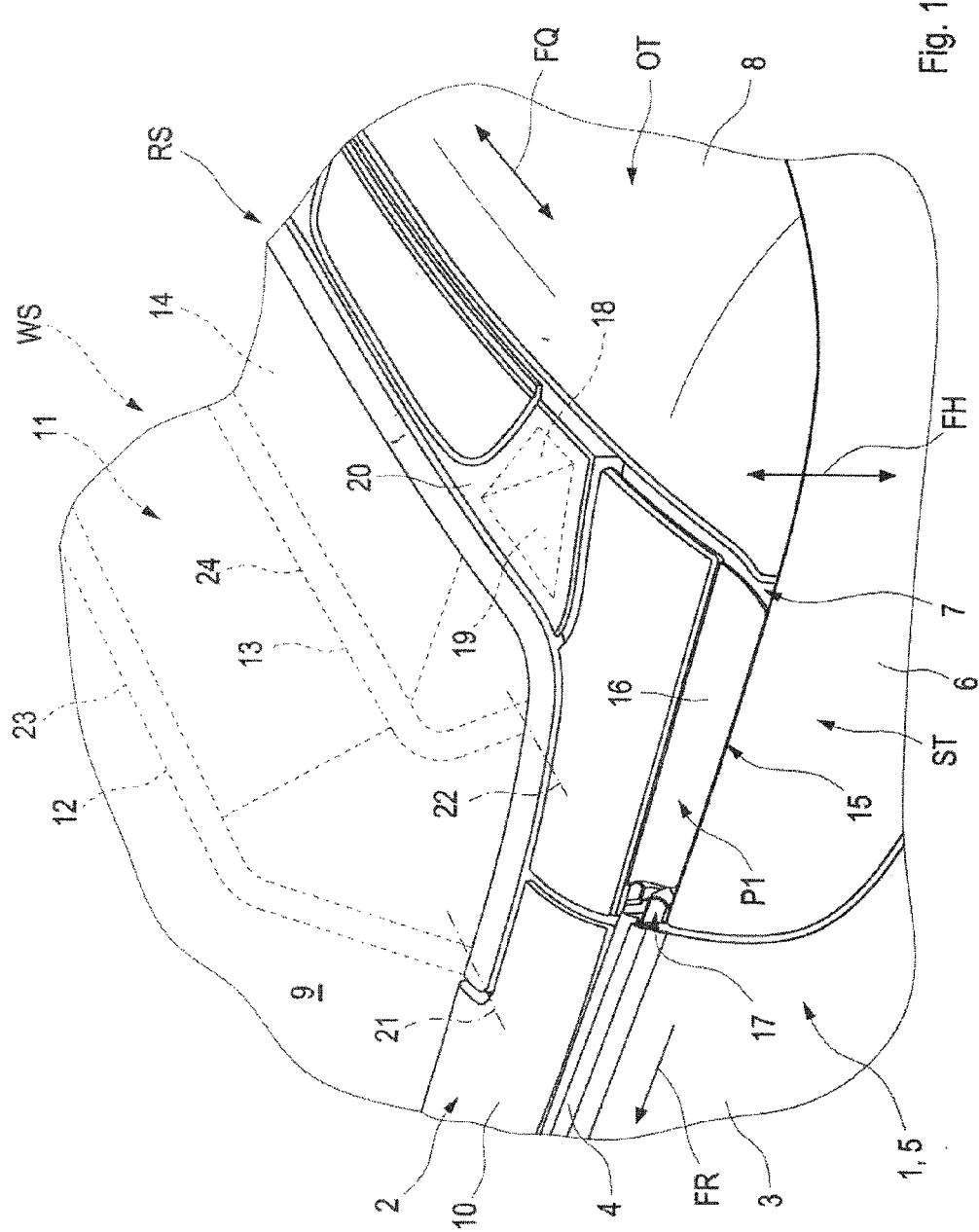
FIG. 1 is a perspective view of a convertible having a roof arrangement in an open position, a wind deflector element in a position of rest and an operative position, and a flap of a linkage flap arrangement in a closed position.

A convertible in accordance with the invention is identified by the numeral 1 in FIG. 1. The usual forward direction of travel is identified by an arrow FR. FIG. 1 thus shows a view of the left side 2 of the convertible 1 obliquely from behind. The right side of the convertible 1 is not illustrated, but is embodied in a mirror inverted fashion with respect to the left side 2 shown in FIG. 1. To this extent, the parts described for the left side 2 are also correspondingly present on the right side.

With reference to FIG. 1, the convertible 1 has a rear sidewall 3 that extends as far as a belt line 4 of the vehicle bodywork 5. A soft top box cover 6 at least partially covers a soft top storage box 7 lying underneath when the soft top box cover 6 assumes the closed position ST shown in FIG. 1. A movable roof arrangement 8, which is embodied as a soft top, can assume an open position OT in the soft top storage box 7 so that a vehicle passenger compartment 9 is open completely in the upward direction. The vehicle passenger compartment 9 has interior paneling 10 arranged on the inside of the rear sidewall 3. The convertible 1 also has a wind deflector 11. The wind deflector 11 has a first wind deflector element 12, a second wind deflector element 13 (illustrated by dashed lines in an operative position WS) and a flexible planar element 14 that is deployed into the operative position WS by the two wind deflector parts 12, 13. A linkage flap arrangement 15 is provided and has a flap 16 which, in a closed position P1, closes off a linkage through-opening 17 in FIG. 1. Finally, the convertible 1 also has a drive device 18 and a control device 19. The drive device 18 and the control device 19 can be arranged centrally in the vehicle under a cover 20. The cover 20 is arranged between the left linkage flap arrangement 15 and the right linkage flap arrangement (not shown), and lies approximately in front of the soft top storage box 7.

The drive device 18 functions to adjust the wind deflector 11 between a position of rest RS, in which the wind deflector 11 lies approximately flush with the belt line 4, and an upright operative position WS. The wind deflector also could be manually adjustable. The drive device 18 also preferably adjusts the flap 16 of the linkage flap arrangement from its closed position P1 shown in FIG. 1 into an open position P2 shown in FIG. 2. The control device 19 controls the drive device 18. The drive device 18 comprises, for example, an electric motor or some other drive element that is activated by the control device 19. The control device 19 also ensures that the wind deflector 11 and the linkage flap arrangement 15 are not activated simultaneously but rather successively in chronological succession.

According to FIG. 1, the front or first wind deflector element 12 can be moved about a pivoting axis 21 between the position of rest RS and the operative position WS, wherein the pivoting axis 21 runs in the transverse direction FQ of the vehicle. Similarly, the rear or second wind defector element 13 can be adjusted about a pivoting axis 22 running in the transverse direction of the vehicle, between the stored position of rest RS and the upright operative position WS. Both wind deflector elements 12, 13 are embodied as U-shaped hoops and their free ends sections are mounted on the convertible in the pivoting axes 21 and 22 underneath the interior paneling 10. In the operative position WS, transverse frame parts 23 and 24 of the two wind deflector elements 12, 13 are aligned in an approximately L shape when viewed from the side and the flexible planar element 14 is deployed. In this context, the transverse frame part 24 is provided as a deflection for the planar element 14. One end of the planar element 14 is attached to the transverse frame part 23. The other end (not illustrated) of the flexible planar element 14 is attached to a winding shaft that is stored under the cover 20. The two wind deflector elements 12 and 13 rest on one another in the position of rest RS, as can be seen in the unbroken line in FIG. 1, and are approximately flush with the interior paneling 10, the flap 16 and the cover 20. The flexible planar element 14 is wound onto the winding shaft in the position of rest RS.

Figure 2:
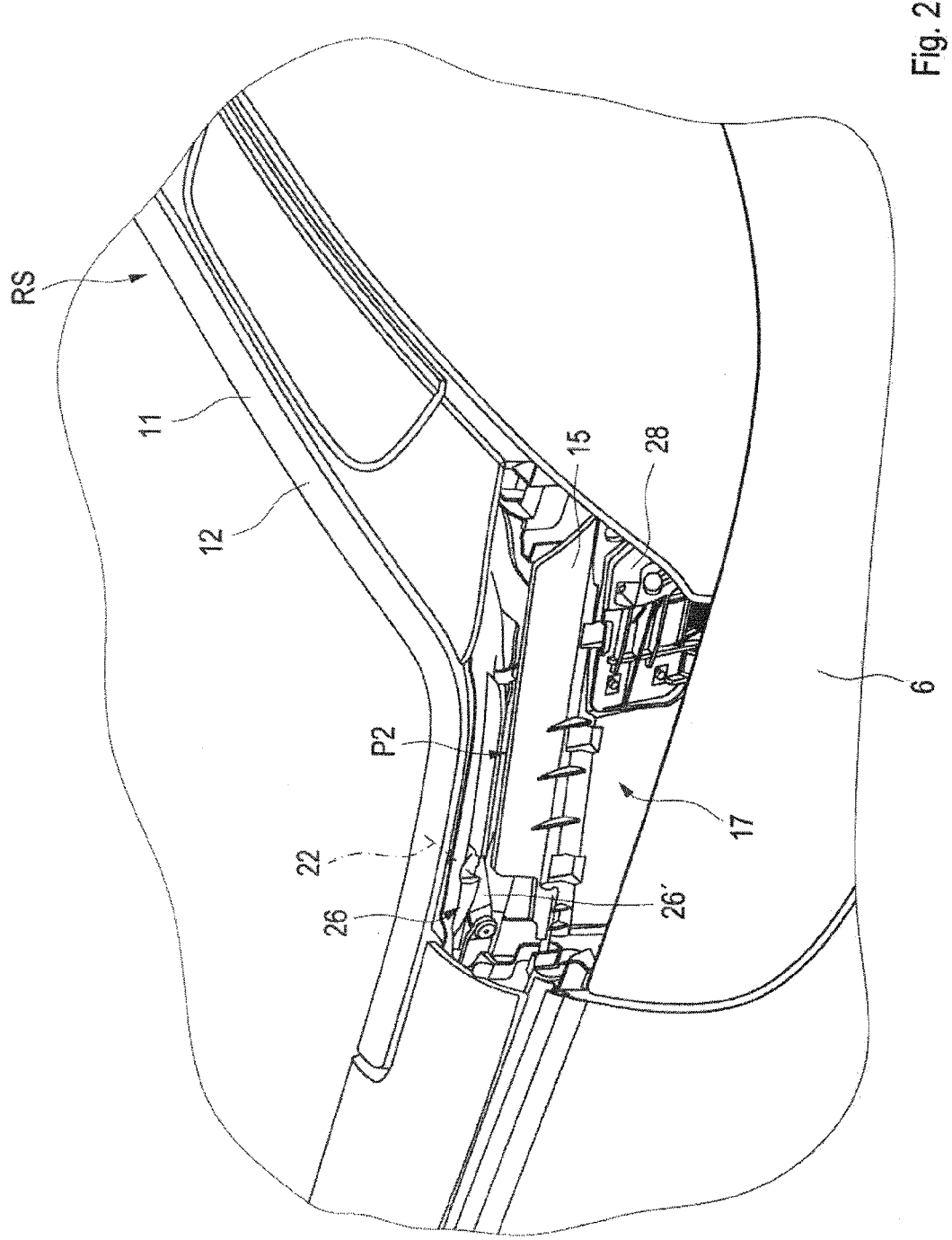
FIG. 2 shows the convertible of FIG. 1 with the wind deflector element in the position of rest and a flap of the linkage flap arrangement in an open position.

The flap 16 closes off the through-opening 17 for a soft top linkage of the roof arrangement 8 when the flap 16 is in the closed position P1 of FIG. 1. The soft top linkage is not shown in FIG. 1, but a section of a lateral roof frame 25 of the soft top linkage is shown in FIG. 3. The outer surface of the flap 16 is flush with the cover 20 and the interior paneling 10 when the flap 16 is in the closed position P1 of FIG. 1. FIG. 2 shows the flap 16 in the open position P2 where the flap 16 almost completely opens the through-opening 17. Thus, the soft top linkage with the roof frame 25 can pass through the through-opening 17 to move the roof arrangement 8 from the stored position into a covering position AT for covering the passenger compartment 9 of the vehicle, as shown in FIG. 3. The roof frame 25 or the soft top linkage can be coupled pivotably to a soft top bearing (not shown) arranged under the interior paneling 10.

The open position P2 of the flap 15 shown in FIG. 2 permits a linkage section 26 of the wind deflector elements 12, 13 to be seen lying underneath the interior paneling 10. The two free ends of the wind deflector elements 12, 13 are mounted in the pivoting axes 21 and 22 and are connected to one another via a coupling 26', which can be seen in FIG. 2. The drive device 18 can drive the first or second wind deflector element 12, 13 or the coupling device 26' only when the wind deflector 11 is to be adjusted between the position of rest RS and the operative position WS. Moreover, this driving is possible only if the flap 16 is in the closed position P1 shown in FIG. 1. Only then can the wind deflector 11 be moved from the position of rest RS into the operative position WS, or vice versa.

The flap 16 or the linkage flap arrangement 15 has a position detector 27 that cooperates with the control device 19 to detect the closed position P1. FIG. 4 shows the linkage flap arrangement 15 with the flap 16 in an intermediate posture between the closed position P1 and the open position P2. The flap 16 is attached to a carrier 28 that is coupled via a pivoting axis 29 to a longitudinally adjustable carriage 30 that can be slid along a guide 31 in the vertical direction FH of the vehicle. A control mechanism 32 is arranged between the carriage 30 and the carrier plate 28 and ensures that the flap 16 can execute a pivoting movement about the pivoting axis 29 when the carriage is moved along the guide 31 in the vertical direction FH of the vehicle. For this purpose, the control mechanism 32 is guided in a guide track 33.

Parts of the carriage 30 that are guided in a sliding fashion on the guide 31 are shown in FIG. 5. One end 34 of a drive cable 35 is secured to an element 36 of the carriage 30. A control element 37, for example in the form of a clip, is arranged on this element 36 and cooperates with at least one sensor 38 or 39 of the position detector 27. The sensors 38 and 39 are arranged on the guide 31 to detect whether the flap 16 assumes its closed position P1 or open position P2. The lower sensor 38 corresponds to the open position P2, and the control element 37 aligns with the lower sensor 38 when the flap 16 is in the open position P2. The control element 37 aligns with the upper sensor 39 when the flap 16 is in the closed position P1. The position detector 27, with its sensors 38 and 39, is connected to the control device 19 so that the control device 19 detects whether the flap 16 assumes the closed position P1 or open position P2. The flap 16 can be adjusted between the closed position P1 and the open position P2 via the drive cable 35, which is connected to the drive device 18.

The wind deflector 11 can be moved between the position of rest RS and the operative position WS, and vice versa, only if the flap 16 is in the closed position P1 in which the control element 37 lies opposite the upper sensor 39 of the position-detection device 27. As a result, the control device 19 detects that the flap 16 assumes the closed position P1. The drive device 18 then can move the wind deflector 11 as required into the position of rest RS or the operative position WS. On the other hand, the control device 19 detects an open position P2 of the flap 16 when the lower sensor 38 aligns with the control element 37 and hence the control device 19 shuts off the drive device 18 for the wind deflector 11.

As explained above, the linkage flap arrangement 15 is provided on each longitudinal side of the convertible 1. Each linkage flap arrangement 15 preferably has the above-described position-detection device 27. As a result, the open position P2 and the closed position P1 of the respective flap 16 can be detected on both linkage flap arrangements 15.

The movable roof arrangement 8 has a soft top drive that is not illustrated here. The soft top drive functions to drive the soft top linkage of the roof arrangement 8 so that the roof top arrangement 8 can be adjusted between the open position OT in the storage box 7 and the covering position AT, in which the roof top arrangement 8 covers the passenger compartment 9. However, the control device 19 permits a movement between the open position OT and the covering position AT of the roof arrangement 8 only if the position-detection device 27 determines the open position P1 of the flaps 16 because only then can the roof frame 25, be moved into the linkage through-opening 17. The control device 19 therefore also controls the soft top drive of the roof arrangement 8. Furthermore, adjustment of the roof arrangement 8 between the open position OT and the covering position AT preferably can be performed only if the wind deflector 11 assumes its folded-down position of rest RS. This control also is performed by the control device 19. The movement of the roof arrangement 8 therefore is enabled only if the flap 16 assumes its open position P2, and the wind deflector 11 assumes its position of rest RS. To determine the respective position of the wind deflector 11, the position-detection device 27 or a further detection device can be assigned at least one further sensor (not illustrated) arranged on the convertible 1 to detect at least the position of rest RS of the wind deflector 11. Such a sensor can be arranged underneath the interior paneling 10 and can, for example, detect the position, assigned in accordance with the position of rest RS, or of a section, lying underneath the interior paneling 10, of the wind deflector elements 12 and/or 13 and/or of the coupling device 26'. However, it is also possible to provide two sensors, wherein one sensor determines the upright operative position WS and the other sensor determines the position of rest RS of the wind deflector 11.

What is claimed is:

1. A convertible comprising:
    a roof arrangement including a soft top linkage that can be moved between an open position and a covered position;
    linkage through openings provided on longitudinal sides of the vehicle and accommodating the soft top linkage as the soft top linkage is moved between the open position and the closed position;
    flaps for selectively opening and closing the linkage through openings;
    at least one wind deflector element that can be adjusted between a retracted position of rest and a deployed operative position, the wind deflector element being mounted movably on longitudinal sides of the convertible adjacent to the linkage through openings and to interior paneling and having a section arranged underneath the interior paneling;
    a drive device that adjusts the wind deflector element between the position of rest and the operative position, and vice versa;
    a position detector for detecting a position of the flap; and
    a control device that permits adjustment of the roof arrangement only if the position detector detects an open position of the flaps and permits adjustment of the wind deflector element only if the position detector detects a closed position of the flaps.

2. The convertible of claim 1, wherein the wind deflector element is a first wind deflector element, the convertible further comprising an adjustable second wind deflector element connected to the first wind deflector element via a coupling device underneath the interior paneling.

3. The convertible of claim 1, wherein the drive device for the wind deflector element also moves the flaps between open and closed positions.

4. The convertible of claim 1, wherein the position detector for at least one flap comprises two sensors that detect different positions of the flap.

5. The convertible of claim 4, wherein the sensors respectively detect open and closed positions of the flap.

6. The convertible of claim 5, further comprising at least one guide for guiding a movement of the flap between the open and closed positions of the flap, wherein the position detectors are arranged on the guide for the flap.

7. The convertible of claim 1, wherein the control device permits adjustment of the roof arrangement only if the wind deflector element assumes its position of rest.

8. The convertible of claim 1, wherein each of the flaps is mounted pivotally to a carrier that is movable substantially vertically along a guide between an upper position and a lower position, each of the flaps being pivotable relative to the carrier and movable into the closed position when the carrier is in the upper position, the position detectors being arranged on the guide and being disposed to detect a position of the carrier on the guide.

* * * * *